United States Patent
Wang et al.

(10) Patent No.: US 9,239,624 B2
(45) Date of Patent: Jan. 19, 2016

(54) FREE HAND GESTURE CONTROL OF AUTOMOTIVE USER INTERFACE

(75) Inventors: Kongqiao Wang, Helsinki (FI); Leo Kärkkäinen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 277 days.

(21) Appl. No.: 13/446,793

(22) Filed: Apr. 13, 2012

(65) Prior Publication Data

US 2013/0271370 A1  Oct. 17, 2013

(51) Int. Cl.
*G06F 3/03* (2006.01)
*G06F 3/01* (2006.01)

(52) U.S. Cl.
CPC ........................... *G06F 3/017* (2013.01)

(58) Field of Classification Search
USPC ........... 345/173, 175, 104, 158, 156; 382/224
See application file for complete search history.

(56) References Cited

U.S. PATENT DOCUMENTS

| | | | |
|---|---|---|---|
| 5,534,917 A | 7/1996 | MacDougall | |
| 6,363,160 B1 | 3/2002 | Bradski et al. | |
| 7,227,526 B2* | 6/2007 | Hildreth | G06T 19/006 345/156 |
| 8,002,416 B2* | 8/2011 | Tejima | 353/70 |
| 8,145,594 B2* | 3/2012 | Geisner | G06F 3/011 707/607 |
| 8,599,209 B2* | 12/2013 | Kameyama | 345/581 |
| 2008/0166022 A1 | 7/2008 | Hildreth | |
| 2008/0181459 A1 | 7/2008 | Martin et al. | |
| 2009/0183125 A1 | 7/2009 | Magal et al. | |
| 2009/0228841 A1 | 9/2009 | Hildreth | |
| 2010/0302145 A1 | 12/2010 | Langridge et al. | |
| 2011/0041100 A1 | 2/2011 | Boillot | |
| 2011/0080490 A1 | 4/2011 | Clarkson et al. | |
| 2011/0154201 A1 | 6/2011 | Nakanishi | |
| 2011/0173204 A1* | 7/2011 | Murillo | A63F 13/06 707/741 |
| 2011/0222726 A1* | 9/2011 | Ruan | G06K 9/00355 382/103 |
| 2011/0268365 A1* | 11/2011 | Lou | G06K 9/00389 382/224 |

(Continued)

FOREIGN PATENT DOCUMENTS

| | | |
|---|---|---|
| EP | 1983402 A1 | 10/2008 |
| EP | 2336868 A1 | 6/2011 |

(Continued)

OTHER PUBLICATIONS

Business Wire; "GestureTek, Patented Inventor of 3D Camera Based Gesture Control, Launches GestPoint Maestro3D™"; dated May 31, 2011; downloaded from http://www.businesswire.com/news/home/20110531006224/en/GestureTek-Patented-Inventor-3D-Camera-Based-Gesture; pp. 1-2.

(Continued)

*Primary Examiner* — Larry Sternbane
*Assistant Examiner* — Robert Michaud
(74) *Attorney, Agent, or Firm* — Alston & Bird LLP

(57) ABSTRACT

A free hand gesture control user interface is described. Components of the interface system may include a stereo vision camera, or multiple cameras, a control unit, a projector and a projecting surface. In an automotive application, the projecting surface may be the windscreen in the vehicle or a mounted screen. The camera together with software modules in the control unit define a gesture acceptance border and a gesture acceptance space within which hand gestures may be imaged, defined for various control actions, and executed. The hand images are analyzed in slices of the gesture acceptance space to determine hand orientation (open or closed) and/or motion.

20 Claims, 8 Drawing Sheets

(56) References Cited

U.S. PATENT DOCUMENTS

2013/0279756 A1* 10/2013 Menadeva .......... G06K 9/00355
382/103
2014/0237432 A1* 8/2014 Geurts .................... G06F 3/005
715/863

FOREIGN PATENT DOCUMENTS

| WO | WO-0030023 A1 | 5/2000 |
| WO | WO-0207839 A2 | 1/2002 |
| WO | WO-2009/128064 A2 | 10/2009 |
| WO | WO-2010/049790 A1 | 5/2010 |
| WO | WO-2011/056731 A2 | 5/2011 |

OTHER PUBLICATIONS

GestureTek; "3D Depth Sensing"; downloaded at http://www.gesturetek.com/3ddepth/introduction.php on Jun. 14, 2012; pp. 1-4.
Motion Capture Solutions—eyeSight's Touch Free Technology; downloaded at http://www.eyesight-tech.com/solutions on Jun. 14, 2012; pp. 1-4.
International Search Report and Written Opinion for Application No. PCT/FI2013/050312, dated Jul. 31, 2013.
Extended European Search Report for corresponding European Application No. 13775414.9 dated Oct. 19, 2015, 8 pages.
Lad, S. et al., *Real Time Hand Tracking and Gesture Recognition, Digital Image and Processing*, Monsoon (2011). Retrieved from the Internet: <URL:http://web.iiit.ac.in/~shrenik.lad/Reports/Hand_Gesture_Recognition.pdf>. 32 pages.

* cited by examiner

The original palm image

The segmentation result on a slice within the gesture acceptance region

The original fist image

The segmentation result on a slice within the gesture acceptance region

FREE HAND GESTURE CONTROL OF AUTOMOTIVE USER INTERFACE

FIELD

An example embodiment of the present invention relates to the field of automated user interface control of computerized machines, and particularly to stereovision based sensing of free hand control signals made by an automobile operator in a vehicle.

BACKGROUND

There have been rudimentary attempts to develop machines that respond to free hand indicators of control commands. Certain attempts have addressed localized hand control regions in the view of one or more cameras using image structure methods or statistical learning for user interface (UI) control. Some are as simple as "on/off" control by waving a hand before a sensor of some type (e.g. photosensor or infrared (IR) sensor). Other methods involve defining a space in a region dictated by the camera system setup where only hand gestures within the defined region are accepted by the interaction system. However, these systems dictate a three-dimensional control area and the user needs to gesture within the control area, which may not necessarily be convenient for the user. These systems may also be challenged in regards to efficiently defining and recognizing gestures which fit a user's preference, and avoiding accidental gestures in gesture interactions, particularly in conjunction with an automotive UI.

BRIEF SUMMARY

An example embodiment of the invention is a method for interactive gesture control comprising defining a distance from an imaging device as a gesture acceptance border, defining a gesture acceptance space beyond the gesture acceptance border, training a gesture controlled system to recognize a user's hand position and movement within the gesture acceptance space, and associating each of the trained hand positions and movements with a control command or function. The method may further comprise executing a control command or function associated with the user's hand position or movement. The method may include providing a controller, and providing said controller with computer program instructions for performing gesture recognition. For interactivity, the method may further comprise providing a display device for interactive control. For determining imaged gestures, the method may further comprise segmenting the gesture acceptance space into slices for analysis of an image, computing the distance between each of a plurality of sampling points on a hand image contour and a center point on the image, computing the mean distance from the plurality of distances, and computing the mean variance of the plurality of mean distances. With that data, the method may further comprise comparing the calculated mean variance of one image to the calculated mean variance of a second image to distinguish an image of an open hand from an image of a closed fist, and assigning control functions to respective open and closed hand gestures. For movement gestures, the method may further comprise causing storage of the computed mean variance of an image of an open hand close to the gesture acceptance border and the computed mean variance of an image of an open hand extended far into the gesture acceptance space, and determining movement of said hand respectively toward and away from the imaging device by comparing the relative mean variances of the open hand segmented slices as the hand moves through the gesture acceptance space. Finally, the method may comprise assigning a display function to movement of the hand toward the imaging device, and assigning a different display function to movement of the hand away from the imaging device.

Another embodiment is an apparatus comprising at least one processor and at least one memory having computer program instructions stored therein with the at least one memory and the computer instructions, with the at least one processor, causing the apparatus to at least define a distance from the imaging device as a gesture acceptance border, define a gesture acceptance space beyond the gesture acceptance border, train a gesture controlled system to recognize a user's hand position or movement within the gesture acceptance space, and associate each of the trained hand positions and movements with a control command or function. The at least one memory and the computer instructions, with the at least one processor, may cause the apparatus to execute a control command or function associated with the user's hand position or movement. The at least one memory and the computer instructions, with the at least one processor, may further cause the apparatus to segment the gesture acceptance space into slices for analysis of an image, compute the distance between each of a plurality of sampling points on a hand image contour and a center point on the image, compute the mean distance from the plurality of distances, and compute the mean variance of the plurality of mean distances. The at least one memory and the computer instructions, with the at least one processor, may further cause the apparatus to store the computed mean variance of an image of an open hand close to the gesture acceptance border and the computed mean variance of an image of an open hand extended far into the gesture acceptance space, and determine movement of said hand respectively toward and away from the imaging device by comparing the relative mean variances of the open hand segmented slices as the hand moves through the gesture acceptance space. The at least one memory and the at least one memory, with the at least one processor, may also be caused to assign a display function to movement of the hand toward the imaging device, and assign a different display function to movement of the hand away from the imaging device.

In another embodiment, a computer program product is provided that comprises a non-transitory computer readable medium having computer instructions stored therein with said instructions when executed causing an apparatus to define a distance from the imaging device as a gesture acceptance border, define a gesture acceptance space beyond the gesture acceptance border, train a gesture controlled system to recognize a user's hand position or movement within the gesture acceptance space, associate each of the trained hand positions or movements with a control command or function to be executed; and associate each of the trained hand positions and movements with a control command or function. The computer program product instructions when executed may also cause the apparatus to execute a control command or function associated with the user's hand position or movement. The computer program product instructions when executed may further cause the gesture controlled system to segment the gesture acceptance space into slices for analysis of an image, compute the distance between each of a plurality of sampling points on a hand image contour and a center point on the image, compute the mean distance from the plurality of distances, and compute the mean variance of the plurality of mean distances. The computer program product when executed by the processor may further cause the apparatus to store the computed mean variance of an image of an open hand close to the gesture acceptance border and the computed mean variance of an image of an open hand extended far into the gesture acceptance space, and determine movement of said hand respectively toward and away from the imaging device by comparing the relative mean variances of the open hand segmented slices as the hand moves through the gesture acceptance space. The computer program product may assign a display function to movement of the hand toward the imaging device, and assign a different display function to movement of the hand away from the imaging device.

In a further embodiment, an apparatus is provided that includes a means, such as an imaging device, a processor or a computer program product, for defining a distance from an imaging device as a gesture acceptance border, means such as an imaging device or a processor for defining a gesture acceptance space beyond the gesture acceptance border, means such as an imaging device, a display or a processor, for training a gesture controlled system to recognize a user's hand position and movement within the gesture acceptance space; and means, such as a processor or a computer program product, for associating each of the trained hand positions and movements with a control command or function.

BRIEF DESCRIPTION OF THE DRAWINGS

Figure 1:
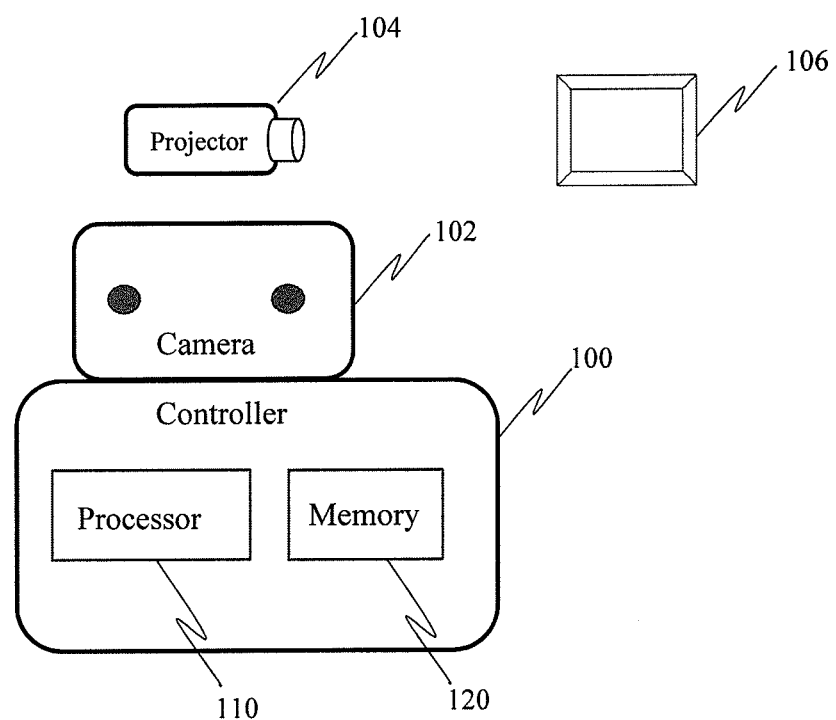

Having thus described certain embodiments of the invention in general terms, reference will now be made to the accompanying drawings, which are not necessarily drawn to scale, and wherein:

FIG. 1 is a schematic representation of the components of a system that may be configured in accordance with an example embodiment.

Figure 2:
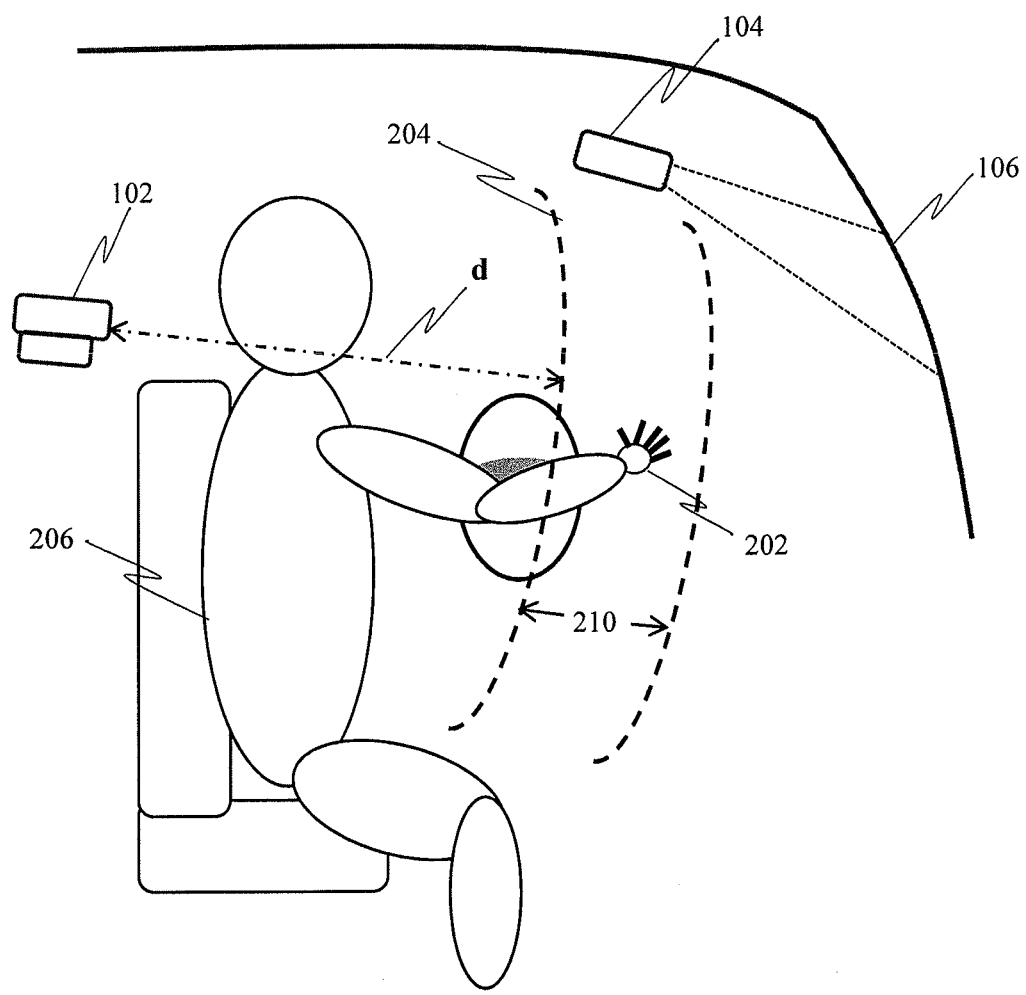

FIG. 2 is a schematic drawing of the configuration of a system being trained in accordance with one embodiment of the invention.

Figure 3:
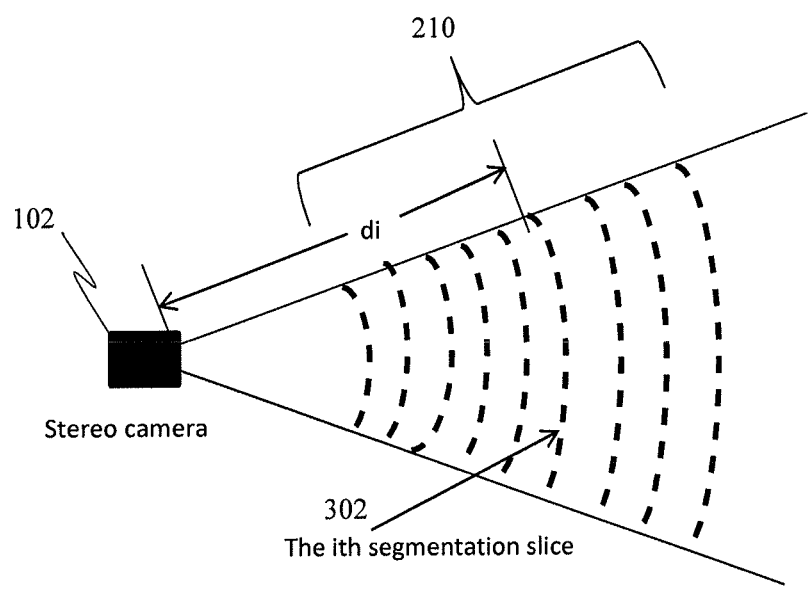

FIG. 3 is a schematic representation of one aspect of the operation of an example embodiment of the invention.

Figure 4:
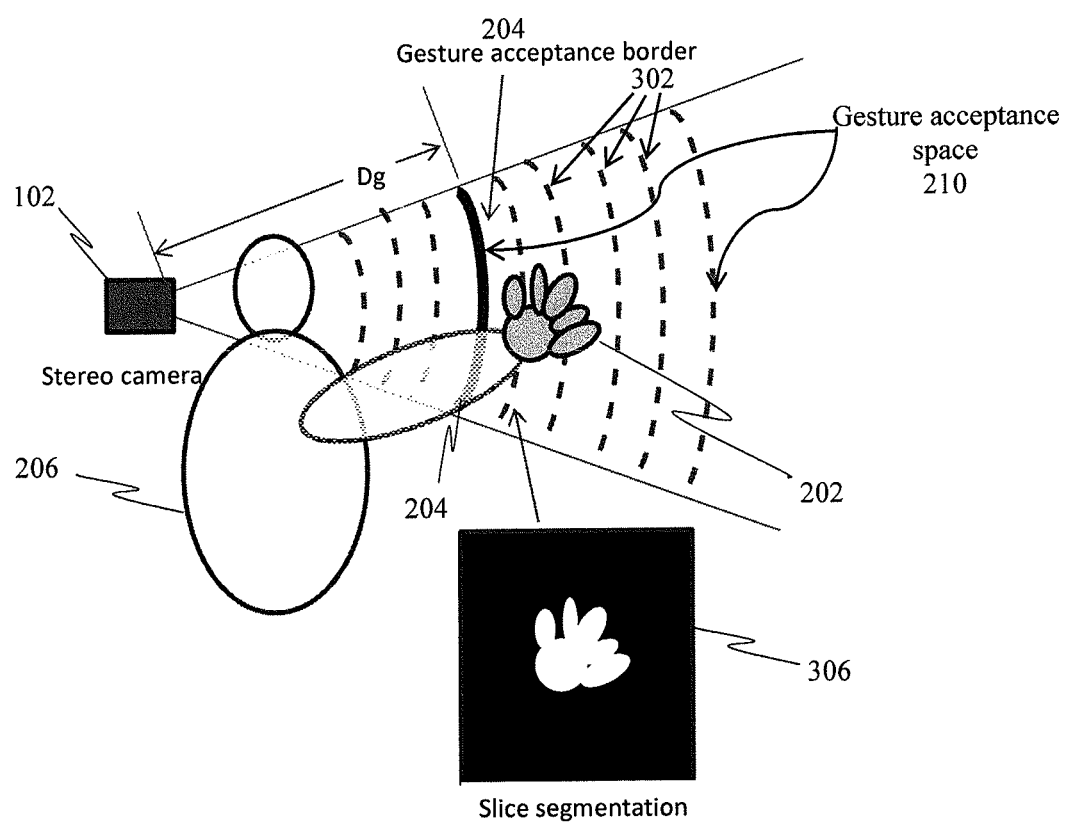

FIG. 4 is a schematic representation of the operation of an example embodiment of the invention.

Figure 5:
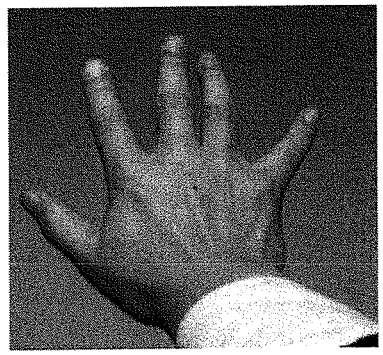
Figure 5:
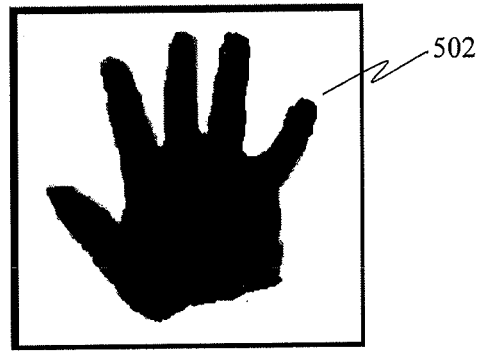
Figure 5:
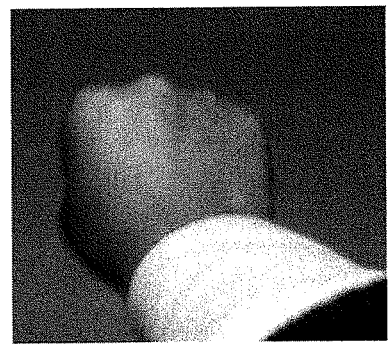
Figure 5:
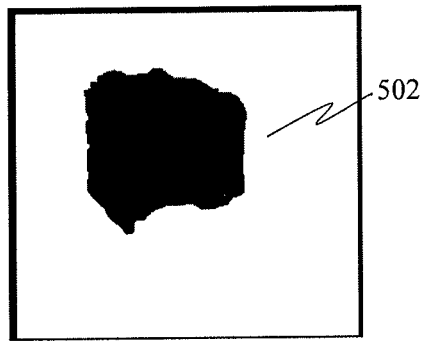

FIG. 5 is an illustration of the images sensed by an example embodiment of the invention.

Figure 6:
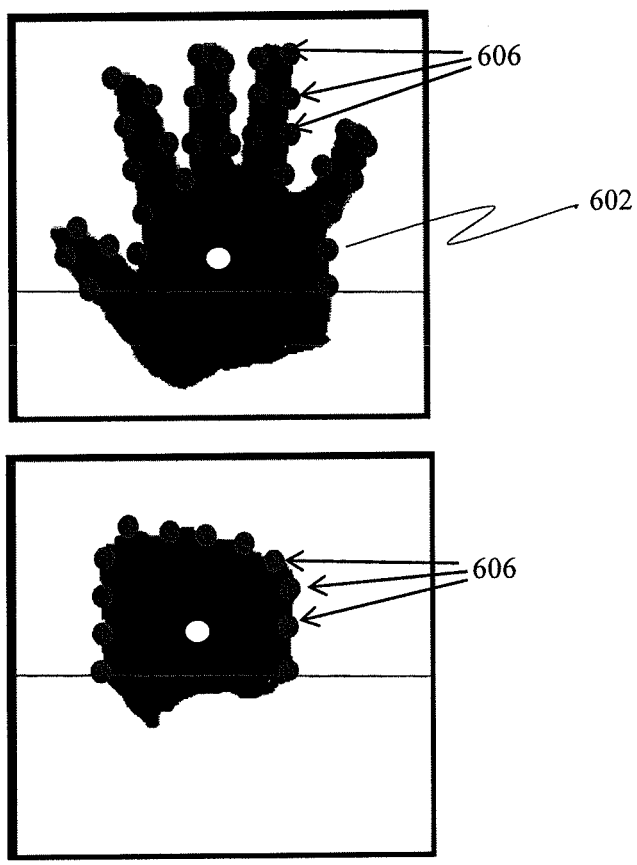

FIG. 6 is an illustration of the computational points used in an example embodiment of the invention.

Figure 7:
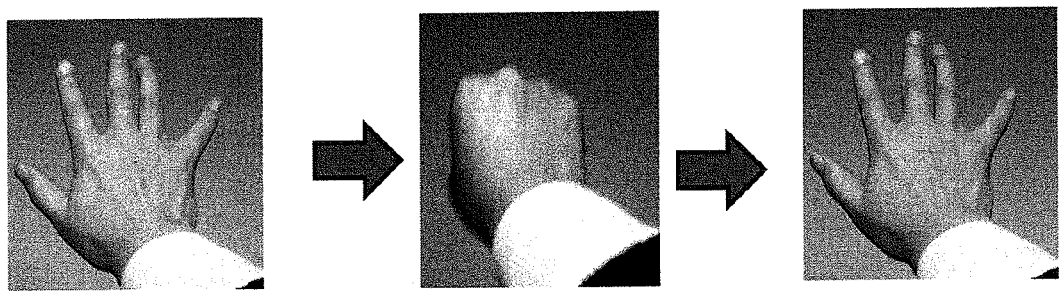

FIG. 7 is an example of a command motion for use in an example embodiment of the invention.

Figure 8:
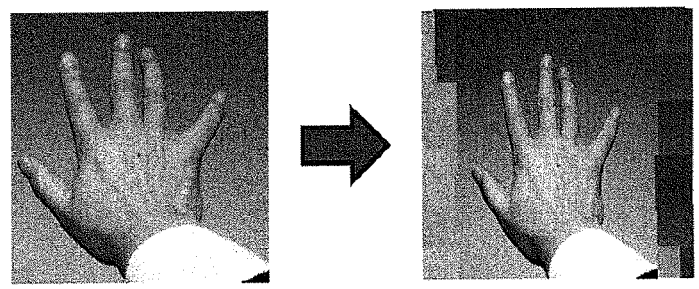

FIG. 8 is a second example of a command motion for use in an example embodiment of the invention.

Figure 9:
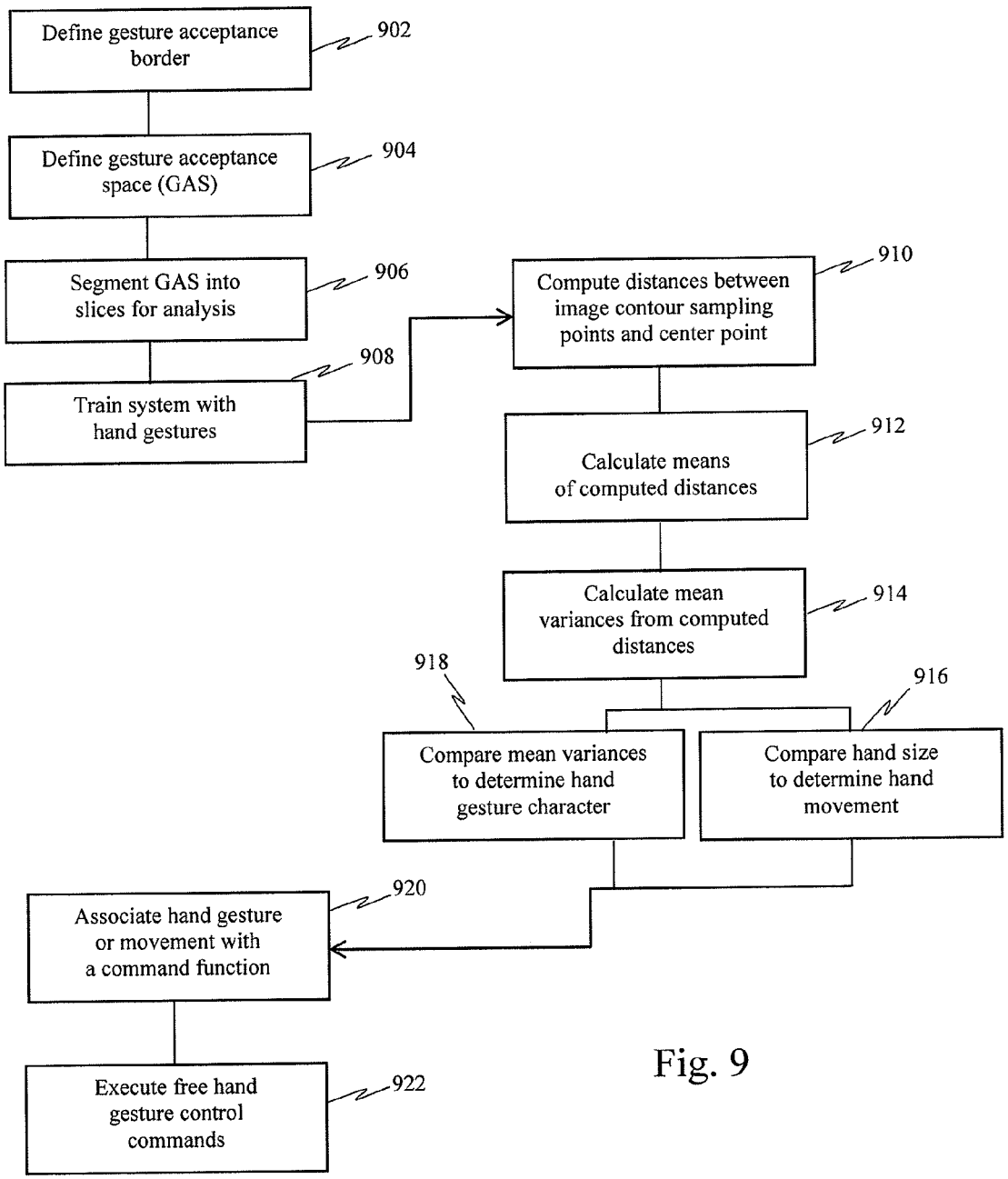

FIG. 9 is a flow chart of a method in accordance with an example embodiment of the invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

In an example embodiment, a camera gesture control system for a user interface, such as an automotive user interface, is disclosed. A user can define a gesture acceptance space that he/she can conveniently and comfortably reach. Although the gesture control system may be used in various environments, this description will focus on an automotive use for purposes of example, but not of limitation. The gesture control is a natural in-car interaction solution which enables free hand gestures operating on projected images. For example, a navigation map may be projected onto the windscreen from the control device via a connected pico projector and the map may be manipulated using hand gesture display control.

Referring to FIG. 1 (not to scale illustration), components of the gesture control system of one embodiment include a control unit 100 and a stereo (two-lens) camera 102 for detecting and tracking the operator's hand movement in front of the camera so that a software (SW) component can interpret the hand movements into UI commands. Alternatively, any optical device or combination of devices that affords depth perception in an image may take the place of a stereo-vision camera 102. Examples of such devices would be multiple single image cameras and one or more charge coupled optical devices.

A pico projector 104 projects an interactive image to any surface. In automotive use, the image may be projected onto the windscreen interior surface. Alternatively, a smaller screen 106 may be mounted on or below dash level, or hung from above, to reflect the projected image. Also alternatively, a display device, such as a digital display, may provide the visual aspect of the control system. A free hand gesture recognition software program resides in or is otherwise accessible by the control unit to convert hand movements into UI commands, store them, then recognize the stored hand movements as the user executes them.

The controller 100 comprises at least one processor 110 and at least one memory 120 containing computer program instructions that are generally organized into modules for causing the processor 110 to perform the command control and image analysis tasks in the system. The controller 100 may include, for example, processing circuitry that is configurable to perform actions in accordance with an example embodiment described herein. The processing circuitry may be configured to perform data processing, application execution and/or other processing and management services according to an example embodiment of the present invention. In some embodiments, the processing circuitry may be embodied as a chip or chip set. In other words, the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry may include at least one processor 110 and at least one memory 120. As such, the processing circuitry may be embodied as a circuit chip (e.g., an integrated circuit chip) configured (e.g., with hardware, software or a combination of hardware and software) to perform operations described herein.

In an example embodiment, the memory 120 may include one or more non-transitory memory devices such as, for example, volatile and/or non-volatile memory that may be either fixed or removable. The memory may be configured to store information, data, applications, instructions or the like for enabling the controller 100 to carry out various functions in accordance with example embodiments of the present invention. For example, the memory could be configured to buffer input data for processing by the processor. Additionally or alternatively, the memory could be configured to store instructions for execution by the processor. For example the memory may store the gesture setting SW module as discussed herein. As yet another alternative, the memory may include one of a plurality of databases that may store a variety of files, contents or data sets. For example, the memory may store the UE commands, such as in association with a respective gesture. Among the contents of the memory, applications may be stored for execution by the processor in order to carry out the functionality associated with each respective application. In some cases, the memory may be in communication with the processor via a bus for passing information among components of the apparatus.

The processor 110 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 28 or otherwise accessible to the processor. As such, whether configured by hardware or by a combination of hardware and software, the processor may represent an entity (e.g., physically embodied in circuitry—in the form of processing circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

The controller 100 may be a wireless device communicating with the other system components (camera 102, projector 104 or display device) via radio frequency carrier modulated with digital data signals. Alternatively, the system may be connected by cable(s) for direct wired communication among the components.

Referring to FIG. 2, a gesture setting SW module can help a user set the gesture acceptance space conveniently based on the length of his/her arm 202. For example, the user 206 sits on the driving seat in the car and reaches out the right or left arm 202 with comfort. The user 206 selects the depth (d) of camera view until his/her hand 202 can be fully shown on the projected screen 106, which means his/her hand can be fully segmented from the image layer at the selected depth of camera view. The corresponding depth (d) is recorded in the controller for setting the gesture acceptance border 204 and gesture acceptance space 210. For example, the depth d may define one boundary of the gesture acceptance space, that is, the boundary furthest away from the user. The gesture acceptance border 204 and, therefore, the gesture acceptance space may be defined based upon the depth d, such as by being defined as a predefined distance or spacing from the depth d, as measured in a direction toward the user.

Referring to FIG. 3, the stereo camera detects depth in the camera view so that the system can only accept hand gestures as UI control when the hand gestures are performed in a gesture acceptance space 210 established by the user in front of the camera 102. The camera gesture system can cut the camera view space into different slices 302 based on the depth just like the slices of a computer tomography (CT) scan. The gesture setting module will display the slice segmentation on the screen corresponding to the given depth (di for the ith segmentation slice in FIG. 3).

Beyond the gesture acceptance space 210 defined by the user with the help of the gesture setting module, the system includes a method implemented by the processor and the memory to detect hand gestures on segmentation slices 302, and define the conversion of gestures into UI commands. Examples of hand gestures defining associated functions may include:

Palm movement: projected screen mouse (cursor) movement

First movement: dragging, flicking or swiping (fast hand movement)

Grasping gesture (palm->fist->palm): selection, confirmation

Shaking a palm: return, remove, or delete

Moving a palm towards or away from the camera: zoom

With this type of gesture set, all of the operations on the user interface can be performed.

The view field of the stereo camera 102 is divided into the gesture acceptance space 210 and gesture rejection space by the gesture acceptance border 204 (FIG. 2), a curved imaginary surface on which each point has the same distance d to the camera as the source (d can be adjusted according to the practical situation cases). The gesture acceptance space 210 is the space farther than d from the camera 102, while the closer space less than d from the camera is the gesture rejection space. The gesture acceptance space 210 has its farthest extent at the farthest reach of the user's arm 202.

Referring to FIG. 4, an illustration of the gesture detection process is presented. The user 206 extends a hand 202 past the gesture acceptance border 204 into the gesture acceptance space 210. The camera captures a multi-slice image within the gesture acceptance space. The hand is then located in one or several neighboring image slices in the gesture acceptance space. That is, the hand is segmented by the slices 302 within the gesture acceptance space (GAS) 210. By using camera depth measurement and defining the gesture acceptance border 204, the hand region within the gesture acceptance space 210 is fully segmented and analyzed for gesture recognition. User 206 may select an empty space within the car as gesture performing space so that only the hand exists in the segmentation slice(s) 302. The hand is easily detected because it is the unique object in the segmentation slice(s) 302.

The control software is structured in modules that, upon execution by the controller, e.g., the processor, performs functions necessary to the training of the gesture-controlled UI. In order to perform gesture detection, the system must first be configured to establish the gesture acceptance border 204 and gesture acceptance space 210. In the gesture acceptance border module, the camera view is segmented into different slices based on depth. When the user reaches out his/her arm and shows the hand in the camera view, the image segmentation software in the SW module segments the stereo image into various image slices (binary images) based on depth variance, and shows the image slice(s) on the screen so that the user can see if the hand can be segmented. The user can manually adjust the depth so as to see which image slice includes the full hand until a proper depth is selected. Meanwhile there is hand size registration for the hand in the image slice at the gesture acceptance border and the image slice at the farthest distance that the hand can reach within the gesture acceptance space. These index points aid in the detection of hand movement toward and away from the camera.

Referring to FIG. 5, when a palm or fist is shown in the stereo camera view space, the corresponding palm or fist region is segmented from one or several neighboring slices within the gesture acceptance space by a hand region segmentation SW module. Given an image slice 502, the software module selects the largest object from the slice if there are objects in the image slice. If the size of the object is proper referring to the hand sizes registered in the gesture system, a hand region is confirmed. In the neighboring slices, usually the same hand object should also be able to be detected if there is a hand there. This is based on the assumption that if the gesture acceptance space which the hand can reach is empty enough, when there is an object detected in the image slices, it is the hand region. For the case in which the palm or fist region is segmented from several neighboring slices, the segmentation results from the slices are combined to cover the final palm or fist region.

A hand gesture recognition SW module determines which gesture occurs within the gesture acceptance space 210. Based on the confirmed hand region in the image slice within the gesture acceptance space 210, the module determines the hand shape based on a computation of the mean variance of the hand region, and gives a gesture determination based on the hand shape and/or the movement of the hand region. With reference to FIG. 6, hand shapes (palm or fist) can be determined by the weight center 602 (the center dot) of the hand region and related sampling points 606 (x1, x2, x3, xn), selected from the hand contour. The determinant steps are:

1) Compute the distance between each sampling contour point and the weight center, Di=distance(xi, c), i=1, 2, 3, . . . n;

2) Compute the mean distance, $$D = \frac{1}{n}\sum_{i=1}^{n}(D_i)$$

3) Compute the mean variance, $$Var = \sqrt{\frac{1}{n}\sum_{i=1}^{n}(D_i - D)^2}$$

From the palm and fist images in FIG. 6 it can be clearly seen that the distances from the sampling contour points 606 to the weight center point 602 for a palm present a larger variance than the distances for a fist. The mean distance variance of a palm region is much larger than the mean distance variance of a fist region. Hence, by the mean variance, it may be determined whether a hand region on the segmentation slice(s) is a palm or fist.

The stereo camera can track a driver's hand movement in real time and determine the depth of the hand in the camera view field. The stereo camera's focal distance can also be properly adjusted so that the hand can be seen clearly in the gesture acceptance space while blurred in the gesture rejection space. Similar functionality can also be implemented with optic sensing technology.

When the camera monitors the driver's hand moving through the gesture acceptance border from the gesture acceptance space to the gesture rejection space or vice versa, the projected UI gives the driver a reminder or warning so that the driver knows when his/her gestures take effect. Only gestures made within the gesture acceptance space are acceptable.

Once the hand is detected in the gesture acceptance space, the integrated free hand gesture recognition SW module operates for detecting any possible gestures that the hand performs and interprets them into UI commands for controlling the projected UI based upon predefined relationships between each of a plurality of gestures and respective UI commands. The integrated free hand gesture recognition SW module provides a correct judgment of the driver's hand movement in the gesture acceptance space, and is able to recognize what kind of gesture the hand is performing. If the gesture/control function association is not preset, then the system can be trained to recognize at least the minimum gestures and, with the processor through the interface and projected display, associate certain gestures with command functions for control of the UI.

In the present example, the gestures defined to be recognized at least include the following gestures. Referring to FIG. 7, two basic hand shapes are detected, palm and fist. Alternating between an open palm and a fist and back to an open palm establishes a grasping gesture, which may be interpreted as a command of confirmation or selection.

Referring to FIG. 8, in the present example, hand movement is tracked for controlling the mouse (or a cursor) on the projected screen 106. Moving the palm towards or away from the camera is detected as a gesture for a zooming command. In this case, the size of palm is the main parameter for the gesture determination. When the palm size becomes bigger continuously while the hand is moving, a zoom-out command may be the result. Conversely, when the palm size becomes smaller continuously while the hand is moving, a zoom-in command may be the result. Based on the UI command that is identified based upon the gesture, the controller, e.g., the processor, may control the UI, such as the UI provided by a display associated with the controller, so as to implement the UI command.

FIG. 9 is a flowchart illustrating the operations performed by a method, apparatus and computer program product, such as controller 100 of FIG. 1, in accordance with one embodiment of the present invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a non-transitory memory of an controller employing an embodiment of the present invention and executed by a processor of the controller. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIG. 9, when executed, convert a computer or processing circuitry into a particular machine configured to perform an example embodiment of the present invention. Accordingly, the operations of FIG. 9 define an algorithm for configuring a computer or processing circuitry, e.g., processor, to perform an example embodiment. In some cases, a general purpose computer may be provided with an instance of the processor which performs the algorithm of FIG. 9 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified as described below. It should be appreciated that each of the modifications, optional additions or amplifications below may be included with the operations above either alone or in combination with any others among the features described herein.

Referring to FIG. 9, an example embodiment of a method for free hand gesture control is shown. As described above, a gesture acceptance border is defined 902 according to a comfortable distance in front of the camera for the user to extend her hand. Then, a gesture acceptance space 904 is defined as the farthest reach that the user can comfortably extend the hand into the space before the camera. The gesture acceptance space (GAS) is segmented 906 in processing the camera image so as to capture a complete image of the hand when extended into the GAS. That enables the user to train the system 908 to recognize different hand positions (e.g., open hand, closed fist) and hand movement in the GAS.

The system training comprises computing 910 the raw distances (in the image) between sampling points on the image outer contour and a center point of the image. These distances are then arithmetically processed to determine the mean of the distances 912 between the chosen sampling points and the center point. Mean variances of the means distances 914 can be computed and stored such that the mean variances can be compared. For a stationary hand making different gestures (e.g., open hand, closed fist), the mean variances are compared 918 to determine which gesture the hand is presenting in the GAS. The same variances can make it possible to determine that a hand is not simply gesturing, but moving toward or away from the camera in the GAS, wherein the size of the hand can be tracked 916 as it moves within the GAS. Once these gestures and movements are measured they may each be associated 920 with a different command function as a user interface. Free hand gesture control can then be exercised 922 by the user.

Although the invention has been described herein with particular reference to a gesture controlled system for an automobile and driver it is not limited to that application. There are many environments that may be adapted for employment of a gesture controlled command system and all of them are within the scope of this invention. An imaging device combined with a controller with appropriate computer instructions, and a display may be employed in conjunction with one embodiment in order to implement hand gesture control of devices and operations as diverse as televisions, multi-media systems, illumination systems, hydraulic equipment, games, and much more without limit.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
defining a distance from an imaging device as a gesture acceptance border, wherein the distance of the gesture acceptance border from the imaging device is user adjustable independent of a position of the user, and wherein a user is between the imaging device and the gesture acceptance border;
defining a gesture acceptance space beyond the gesture acceptance border;
providing an alert in response to detecting a user's hand moving through the gesture acceptance border;
training a gesture controlled system to recognize a user's hand position and movement within the gesture acceptance space;
associating, with a processor, each of the trained hand positions and movements with a control command or function;
segmenting the gesture acceptance space into slices for analysis of an image; and
recognizing a user's hand position and movement by:
computing a distance between each of a plurality of sampling points on a hand image contour and a center point on the image, computing a mean distance from the plurality of distances, and computing a mean variance of the plurality of distances.

2. The method of claim 1 further comprising:

executing a control command or function associated with the user's hand position or movement.

3. The method of claim 1 further comprising:

providing a controller in a gesture controlled system, and providing said controller with computer program instructions for performing gesture recognition.

4. The method of claim 1 further comprising:

providing a display device for interactive control in the gesture controlled system.

5. The method of claim 1 further comprising:

comparing the calculated mean variance of one image to the calculated mean variance of a second image to distinguish an image of an open hand from an image of a closed fist, and assigning control functions to respective open and closed hand gestures.

6. The method of claim 1 further comprising:

causing the computed mean variance of an image of an open hand close to the gesture acceptance border and the computed mean variance of an image of an open hand extended into the gesture acceptance space to be stored, and determining movement of said hand respectively toward and away from the imaging device by comparing the relative mean variances of the open hand segmented slices as the hand moves through the gesture acceptance space.

7. The method of claim 6 further comprising:

assigning a display function to movement of the hand toward the imaging device, and assigning a different display function to movement of the hand away from the imaging device.

8. The method of claim 1, further comprising:

defining a gesture rejection space between the imaging device and the gesture acceptance border.

9. The method of claim 1, wherein the gesture acceptance border comprises a curved surface on which each point has the same distance to the imaging device.

10. An apparatus comprising:

at least one processor and at least one memory having computer program instructions stored therein, wherein the at least one memory and the computer instructions, with the processor, cause the apparatus to at least:

define a distance from an imaging device as a gesture acceptance border, wherein the distance of the gesture acceptance border from the imaging device is user adjustable independent of a position of the user, and wherein a user is between the imaging device and the gesture acceptance border;

define a gesture acceptance space beyond the gesture acceptance border;

provide an alert in response to detecting a user's hand moving through the gesture acceptance border;

train a gesture controlled system to recognize a user's hand position or movement within the gesture acceptance space;

associate each of the trained hand positions and movements with a control command or function;

segment the gesture acceptance space into slices for analysis of an image; and recognize a user's hand position and movement by causing the apparatus to:

compute a distance between each of a plurality of sampling points on a hand image contour and a center point on the image, compute a mean distance from the plurality of distances, and compute a mean variance of the plurality of distances.

11. The apparatus of claim 10 wherein the at least one memory and the computer program instructions, with the processor, cause the apparatus to:

execute a control command or function associated with the user's hand position or movement.

12. The apparatus of claim 10 wherein the at least one memory and the computer program instructions, with the processor, cause the apparatus to:

compare the calculated mean variance of one image to the calculated mean variance of a second image to distinguish an image of an open hand from an image of a closed fist, and assign control functions to respective open and closed hand gestures.

13. The apparatus of claim 10 wherein the at least one memory and the computer program instructions, with the processor, cause the apparatus to:

cause the computed mean variance of an image of an open hand close to the gesture acceptance border and the computed mean variance of an image of an open hand extended far into the gesture acceptance space to be stored, and determine movement of said hand respectively toward and away from the imaging device by comparing the relative mean variances of the open hand segmented slices as the hand moves through the gesture acceptance space.

14. The apparatus of claim 10 wherein the at least one memory and the computer program instructions, with the processor, cause the apparatus to:

assign a display function to movement of the hand toward the imaging device, and assign a different display function to movement of the hand away from the imaging device.

15. A computer program product comprising a non-transitory computer readable medium having computer instructions stored therein, said instructions when executed causing an apparatus to:

define a distance from the imaging device as a gesture acceptance border, wherein the distance of the gesture acceptance border from the imaging device is user adjustable independent of a position of the user, and wherein a user is between the imaging device and the gesture acceptance border;

define a gesture acceptance space beyond the gesture acceptance border;

provide an alert in response to detecting a user's hand moving through the gesture acceptance border;

train a gesture controlled system to recognize a user's hand position or movement within the gesture acceptance space;

associate each of the trained hand positions or movements with a control command or function to be executed;

segment the gesture acceptance space into slices for analysis of an image; and recognize a user's hand position and movement including computer instructions, when executed, causing the apparatus to:

compute a distance between each of a plurality of sampling points on a hand image contour and a center point on the image, compute a mean distance from the plurality of distances, and compute a mean variance of the plurality of distances.

16. The computer program product of claim 15, the instructions when executed causing the apparatus to:

execute a control command or function associated with the user's hand position or movement.

17. The computer program product of claim 15, the instructions when executed causing the apparatus to:

compare the calculated mean variance of one image to the calculated mean variance of a second image to distinguish an image of an open hand from an image of a closed fist, and assigning control functions to respective open and closed hand gestures.

18. The computer program product of claim 15, the instructions when executed causing the apparatus to:

cause storage of the computed mean variance of an image of an open hand close to the gesture acceptance border and the computed mean variance of an image of an open hand extended far into the gesture acceptance space, and determine movement of said hand respectively toward and away from the imaging device by comparing the relative mean variances of the open hand segmented slices as the hand moves through the gesture acceptance space.

19. The computer program product of claim 15, the instructions when executed causing the apparatus to:

assign a display function to movement of the hand toward the imaging device, and assign a different display function to movement of the hand away from the imaging device.

20. An apparatus comprising:

means for defining a distance from an imaging device as a gesture acceptance border, wherein the distance of the gesture acceptance border from the imaging device is user adjustable independent of a position of the user, and wherein a user is between the imaging device and the gesture acceptance border;

means for defining a gesture acceptance space beyond the gesture acceptance border;

means for segmenting the gesture acceptance space into slices for analysis of an image;

means for training a gesture controlled system to recognize a user's hand position and movement within the gesture acceptance space;

means for associating each of the trained hand positions and movements with a control command or function; and means for recognizing a user's hand position and movement including:

means for computing a distance between each of a plurality of sampling points on a hand image contour and a center point on the image, means for computing a mean distance from the plurality of distances, and means for computing a mean variance of the plurality of distances.

\* \* \* \* \*